US007925011B2

(12) United States Patent  
Gopal et al.

(10) Patent No.: US 7,925,011 B2  
(45) Date of Patent: Apr. 12, 2011

(54) METHOD FOR SIMULTANEOUS MODULAR EXPONENTIATIONS

(75) Inventors: Vinodh Gopal, Westboro, MA (US);
Erdinc Ozturk, Worcester, MA (US);
Kaan Yuksel, Worcester, MA (US);
Gunnar Gaubatz, Worcester, MA (US);
Wajdi Feghali, Boston, MA (US);
Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1152 days.

(21) Appl. No.: 11/610,919

(22) Filed: Dec. 14, 2006

(65) Prior Publication Data
US 2008/0144811 A1     Jun. 19, 2008

(51) Int. Cl.
*H04L 9/00* (2006.01)
(52) U.S. Cl. .............. 380/30; 380/28; 380/44; 380/45; 380/277; 709/228; 713/100
(58) Field of Classification Search .............. 380/30
See application file for complete search history.

(56) References Cited

U.S. PATENT DOCUMENTS

| | | | | |
|---|---|---|---|---|
| 5,274,707 | A * | 12/1993 | Schlafly | 380/30 |
| 6,185,596 | B1 * | 2/2001 | Hadad et al. | 708/491 |
| 6,396,926 | B1 * | 5/2002 | Takagi et al. | 380/28 |
| 6,666,381 | B1 * | 12/2003 | Kaminaga et al. | 235/492 |
| 7,027,597 | B1 * | 4/2006 | Stojancic et al. | 380/28 |
| 7,027,598 | B1 * | 4/2006 | Stojancic et al. | 380/28 |
| 7,187,770 | B1 * | 3/2007 | Maddury et al. | 380/28 |
| 2002/0126838 | A1 * | 9/2002 | Shimbo et al. | 380/28 |

OTHER PUBLICATIONS

Park,H.,et al,'Analysis of the Variable Length Nonzero Window Method for Exponentiation',1999 Elsevier Science, Computers & Mathematics with Applications 37, pp. 21-29, http://www.sciencedirect.com/science?_ob=MImg&_imagekey=B6TYJ-3WKXRBK-3-2&_cdi=5620&_user=2502287&_pii=S089812219900084X&_orig=search&_coverDate=04%2F30%2F1999&_sk=999629992&view=c&wchp=dGLbVtb-zSkWA&md5=16b085d554dcc7dfa3896bc85821120a&ie=/sdarticle.pdf.*
Gordon, D.M., 'A survey of fast exponentiation methods', Center for Communications Research, Dec. 30, 1997, entire document, http://www.ccrwest.org/gordon/jalg.pdf.*

* cited by examiner

*Primary Examiner* — Christian LaForgia
*Assistant Examiner* — Ronald Baum
(74) *Attorney, Agent, or Firm* — Grossman, Tucker, Perreault & Pfleger, PLLC

(57) ABSTRACT

The present disclosure provides a method for performing modular exponentiation. The method may include generating a first remainder (xp) based on an encrypted message (X) modulo a first prime number (p) and generating a second remainder (xq) based on the encrypted message (X) modulo a second prime number (q). The method may further include generating a third remainder (v1) based on the first remainder (xp) raised to a first private key number (d1) modulo the first prime number (p) and simultaneously generating a fourth remainder (v2) based on the second remainder (xq) raised to a second private key number (d2) modulo the second prime number (q). The method may also include subtracting the fourth remainder (v2) from the third remainder (v1) to yield a result (v1−v2) and multiplying the result (v1−v2) by a constant (c) to produce a second result. The method may additionally include generating a sixth remainder (h) by taking the second result modulo the first prime number (p) and multiplying the sixth remainder (h) by the second prime number (q) to produce a third result. The method may further include adding the third result and the fourth remainder (v2) to yield a final result (Y) and generating, at least in part, a public key based on the final result (Y). Of course, many alternatives, variations and modifications are possible without departing from this embodiment.

16 Claims, 7 Drawing Sheets

US 7,925,011 B2

METHOD FOR SIMULTANEOUS MODULAR EXPONENTIATIONS

FIELD

The present disclosure describes a method for modular exponentiation of large integers.

BACKGROUND

Encryption algorithms may be classified as either private-key or public-key. Private-key encryption refers to an encryption method in which both the sender and receiver share the same key. Public-key encryption involves two different but related keys. One key may be used for encryption and one for decryption. Many of today's encryption techniques utilize a public-key/private-key pair. Most public-key algorithms, such as Rivest, Shamir, Adelman (RSA) and Diffie-Helman, perform extensive computations that involve the modular exponentiation of extremely large numbers. These computationally expensive operations are critical in secure protocols such as the Internet Key Exchange (IKE) and Secure Sockets Layer (SSL). Existing modular exponentiation operations utilize vast memory resources, such as register files, and may require an excessive amount of area.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
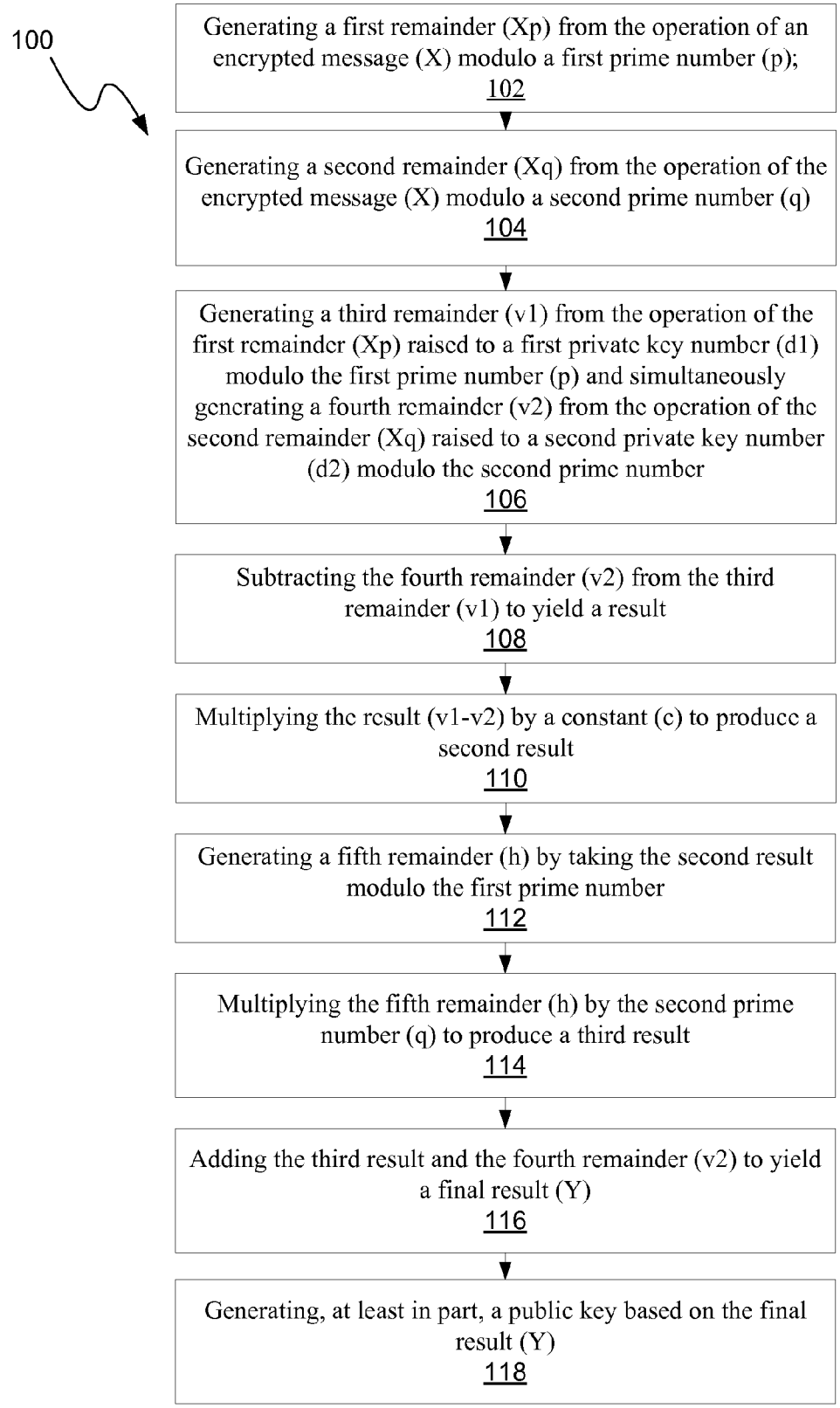
FIG. 1 is a flowchart showing operations in accordance with one exemplary embodiment of the present disclosure.

Although the following Detailed Description will proceed with reference being made to illustrative embodiments, many alternatives, modifications, and variations thereof will be apparent to those skilled in the art.

DETAILED DESCRIPTION

Public key exchange protocols may use a range of keys having different bit lengths. For example, some key exchange protocols may use keys having bit lengths of 1024, 2048, 3072, 4096, 8192 etc. The larger key sizes may require the use of various techniques, such as Karatsuba-Ofman multiplication, Barrett's reduction and the Chinese Remainder Theorem (CRT), each of which may be used to perform mathematical operations on very large numbers. A more detailed description of these techniques may be found in *The Handbook of Applied Cryptography* authored by Alfred Menezes et al., published Jan. 1, 1997 by CRC press.

For example, during a public key negotiation between two parties over an untrusted network, each party may generate a public key. The security strength of the key is typically a function of the size (i.e., bit length) of the key. To generate a key, each party may need to solve an equation of the form: $x = g^a \bmod m$. Given two integers, $g^a$ and m, $g^a \bmod m$ yields the remainder (r) of the division of $g^a$ by m. This calculation may be difficult given the large size of the operands. The computation of the exponent $g^a$, where base g is an element of a finite group and the exponent a is a non-negative integer, may require an efficient method for multiplying two elements in the finite group. While this may be accomplished using conventional multiplication techniques, these techniques may require an excessive amount of memory space, especially as increased security demands causes key lengths to increase.

In RSA, an encryption operation may require the computation of the value of $x^e \bmod N$, where N is the product of two prime numbers, p and q (e.g., in SSL these two numbers may be 512 bits in length). A decryption operation may compute $x^d \bmod N$ using a similar technique. However, if the decrypting party knows the values of p and q, the computation may be optimized using the Chinese Remainder Theorem (e.g., SSL decryption may utilize the CRT in order to perform the RSA operation). The CRT may be used to perform operations in situations where the modulus and exponent values are of the same length (e.g. 512 bits each). As expected, there may be a significant impact on processing speed as the number of bits increases. For example, in some cases multiplications and reductions using 1024 bit operands may be approximately 3-4 times slower than those using 512 bit operands. Various multiplication and reduction techniques (e.g., Karatsuba-based decomposition, Barrett's reduction, etc.) may be used with the Chinese Remainder Theorem to increase system performance.

Generally, this disclosure describes a method for performing modular exponentiation on large operands. In one embodiment the methods described herein may optimize processing performance on modular exponentiation operations using techniques, such as the Chinese Remainder Theorem. The embodiments described herein may be used in accordance with any general purpose processor that includes an integer multiplier and an arithmetic logic unit (ALU).

FIG. 1 shows a flowchart 100 illustrating one method consistent with the present disclosure. Flowchart 100 depicts operations that may be used to perform modular exponentiation on vectors of arbitrary length (e.g., an array of words representing large integers). Operations may include generating a first remainder (Xp) based on an encrypted message (X) modulo a first prime number (p) (e.g., Xp=X mod p) (102). Operations may further include generating a second remainder (Xq) based on the encrypted message (X) modulo a second prime number (q) (e.g., Xq=X mod q) (104). Operations may also include generating a third remainder (v1) based on the first remainder (Xp) raised to a first private key number (d1) modulo the first prime number (p) (e.g., v1=Xp^d1 mod p) and simultaneously generating a fourth remainder (v2) based on the second remainder (Xq) raised to a second private key number (d2) modulo the second prime number (q) (e.g., v2=Xq^d2 mod q) (106). Operations may additionally include subtracting the fourth remainder (v2) from the third remainder (v1) to yield a result (v1−v2) (108). Operations may further include multiplying the result (v1−v2) by a constant (c) to produce a second result (110) and generating a fifth remainder (h) by taking the second result modulo the first prime number (p) (e.g., h=c(v1−v2) mod p) (112). Operations may also include multiplying the fifth remainder (h) by the second prime number (q) to produce a third result (e.g., h*q) (114). Operations may additionally include adding the third result and the fourth remainder (v2) to yield a final result (Y=v2+h*q) (116). Operations may further include generating a public key based on, at least in part, the final result (118). The operations shown in FIG. 1 are summarized in Table 1 below.

TABLE 1

Given:

Inputs: (p, q, d1, d2, c, X)
Output: Y = X^d mod n
Xp = X mod p
Xq = X mod q
v1 = Xp^d1 mod p, v2 = Xq^d2 mod q (here, v1 and v2 may be calculated simultaneously)
h = c(v1 − v2) mod p
Y = v2 + h · q For example, the specific case of a 1024-bit RSA using two 512-bit prime numbers is described herein. Input X may depict an encrypted message and the output Y may refer to the final result (i.e., deciphered plaintext). In this example, both X and Y may be 1024 bit numbers. The modulus (n) in this example may be the product of two secret prime numbers p and q. The public encryption key may be denoted by e and the private decryption key may be denoted by d. Private decryption key d and modulus n may also be 1024 bit numbers in this example. First and second private key numbers d1 and d2 may be computed from private decryption key d using the following equations:

$$d1 = d \bmod (p-1)$$

$$d2 = d \bmod (q-1)$$

In this example, both d1 and d2 may be 512 bits in length. A precomputed constant value (c) may be calculated and may be defined as the modular inverse of q mod p (i.e., c=q^−1 mod p). This constant (c) may be used to calculate $5^{th}$ remainder (h) as shown in Table 1. In one exemplary embodiment, the operations shown in Table 1 may be used to calculate v1 and v2 simultaneously using instruction-interleaving. This disclosure provides a method that may completely interleave the execution streams of the third (v1) and fourth (v2) remainders, computing both problems simultaneously in the inner-most loop where instructions may be scheduled based on latency time.

Figure 2:
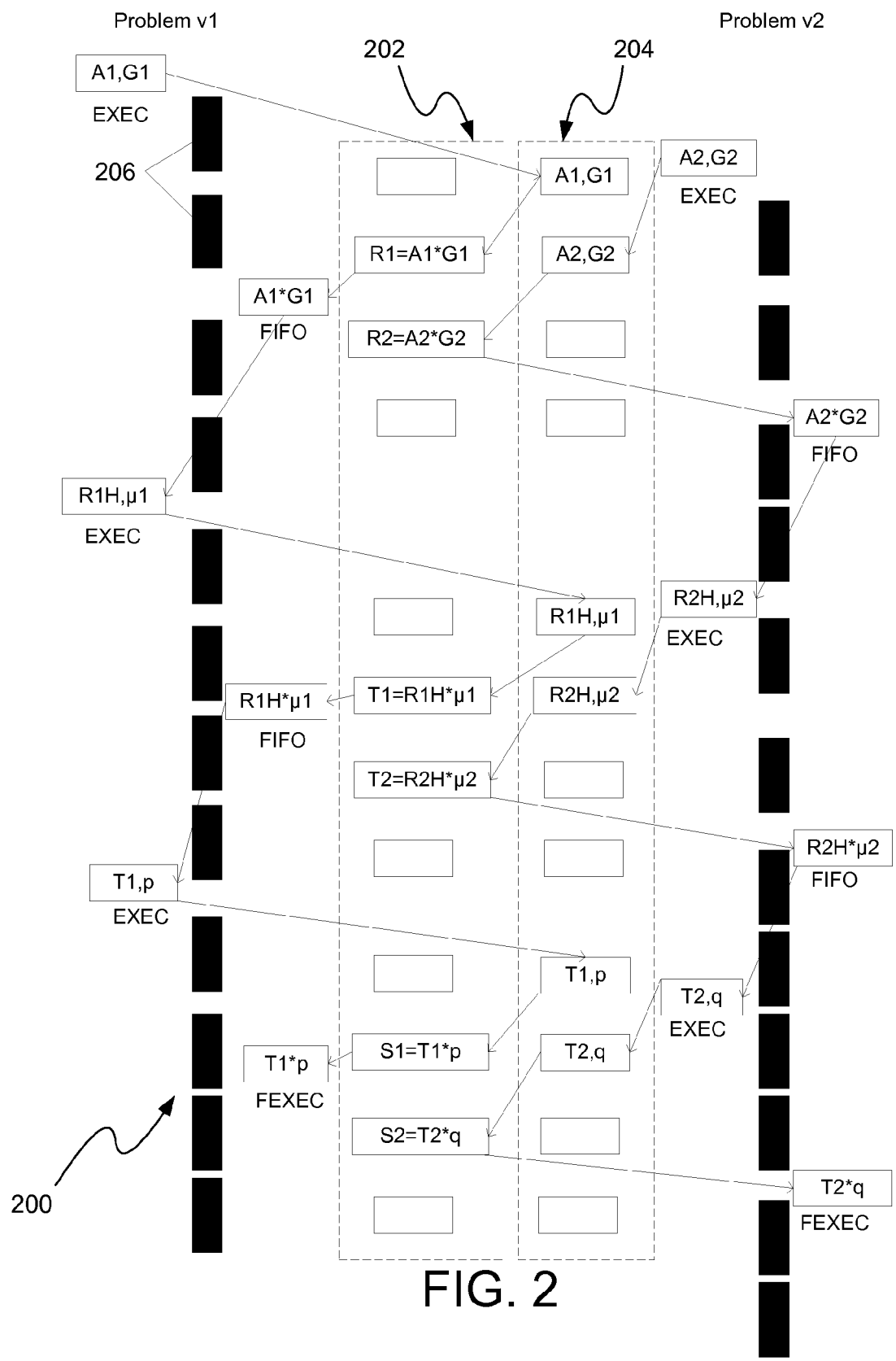
FIG. 2 is a diagram showing another exemplary embodiment in accordance with the present disclosure.

Referring now to FIG. 2, a flow diagram 200 depicting instruction interleaving on a Barrett's Reduction algorithm is shown. Barrett's reduction is a method of reducing one number modulo another number (e.g., x mod m) and may be used when using numbers implemented by multiple precision arithmetic libraries, such as the RSA cryptosystem, which may involve modular exponentiation upon large numbers (e.g., those exceeding 512 bits). Each of the modular reduction operations shown in Table 1 may require a form of Barrett's reduction. Barrett's reduction may require the pre-computation of the quantity μ. In some embodiments, μ may be calculated using the equation μ=(b^2K)/M, wherein the radix b may be chosen as the word size of the processor and m is a modulus having k words. As mentioned above, a more detailed discussion of Barrett's reduction may be found in *The Handbook of Applied Cryptography* authored by Alfred Menezes et al., published Jan. 1, 1997 by CRC press.

Diagram 200 shows an example depicting the simultaneous calculation of a portion of v1 and v2 where v1=Xp^d1 mod p and v2=Xq^d2 mod q. Flow diagram 200 illustrates how multiplication operations may be interleaved. More specifically, flow diagram 200 represents two Barrett's reduction operations for computing A1*G1 mod p and A2*G2 mod q simultaneously. In this example, A1*G1 correspond to Xp and A2*G2 correspond to Xq. These operations (e.g., A1*G1) may be sent to a multiplier via an output FIFO 204. The multiplier performs the operations and the results (e.g., R1, T1, S1, etc.) may return from the multiplier as inputs to input FIFO 202. The dependency chains for v1 and v2 are shown on the left and right, respectively, of FIG. 2. A number of latency bars 206 are shown, each bar correlating to a number of cycles (e.g., 8). In some embodiments, the instruction interleaving shown in FIG. 2 may be used to complete the inner most loops of the two simultaneous problems in approximately 104 cycles (i.e., 13 bars*8 cycles).

In operation, first private key number d1 may be scanned from left-to-right via windowing circuitry (discussed below) until the first non-zero most significant bit (msb) of d1 is obtained (second private key number d2 may be scanned using a similar technique). The main loop of the operations may calculate A1=A1^2 mod p. The operations may continue to scan the next bit of d1 from left-to-right, if that bit is a one, then A1=A1*G1 mod p. The loop may repeat until the least significant bit (lsb) of first private key number d1 is reached.

As mentioned above, each Barrett's multiplication reduction may require a series of multiplication operations (e.g., R1, T1, S1 and R2, T2, S2), as shown in FIG. 2. R1 and R2 may indicate the results of the operations of A1*G1 and A2*G2. Similarly, T1 and T2 may indicate the results of R1H*μ1 and R2H*μ2. S1 and S2 may indicate the results of T1*p and T2*q, respectively. R1H may correspond to the high part of R1, which may reflect a 512-bit right-shifted version of R1. Here, the lowest 512-bits of R may be discarded (e.g., by changing the pointers of the MMP hardware). R2H may be obtained using a similar approach.

Specifically the main loop of the operations for computing v1 and v2 simultaneously may be expressed in pseudo-code as shown in Table 2 below:

TABLE 2

A1 = A2 = 1.
For(I = modulus-size −1 through 0){
    // perform the squares
    G1 = A1, G2 = A2;
    MOD_MULT(A1, G1, p, A2, G2, q);
    If (bit I of d1 = 1) G1 = Xp; else G1 = 1
    If (bit I of d2 = 1) G2 = Xq; else G2 = 1
    MOD_MULT(A1, G1, p, A2, G2, q)
}
Return v1 = A1, v2 = A2.

The function call to MOD_MULT may be the inner-most call that performs the simultaneous multiplication and reduction operations shown in FIG. 2 via two Barrett's reductions. In this example, the main loop does not show fixed windowing for simplicity. However, for performance reasons, groups of bits of d1 and d2 may be scanned using fixed sized exponent windows.

Figure 3:
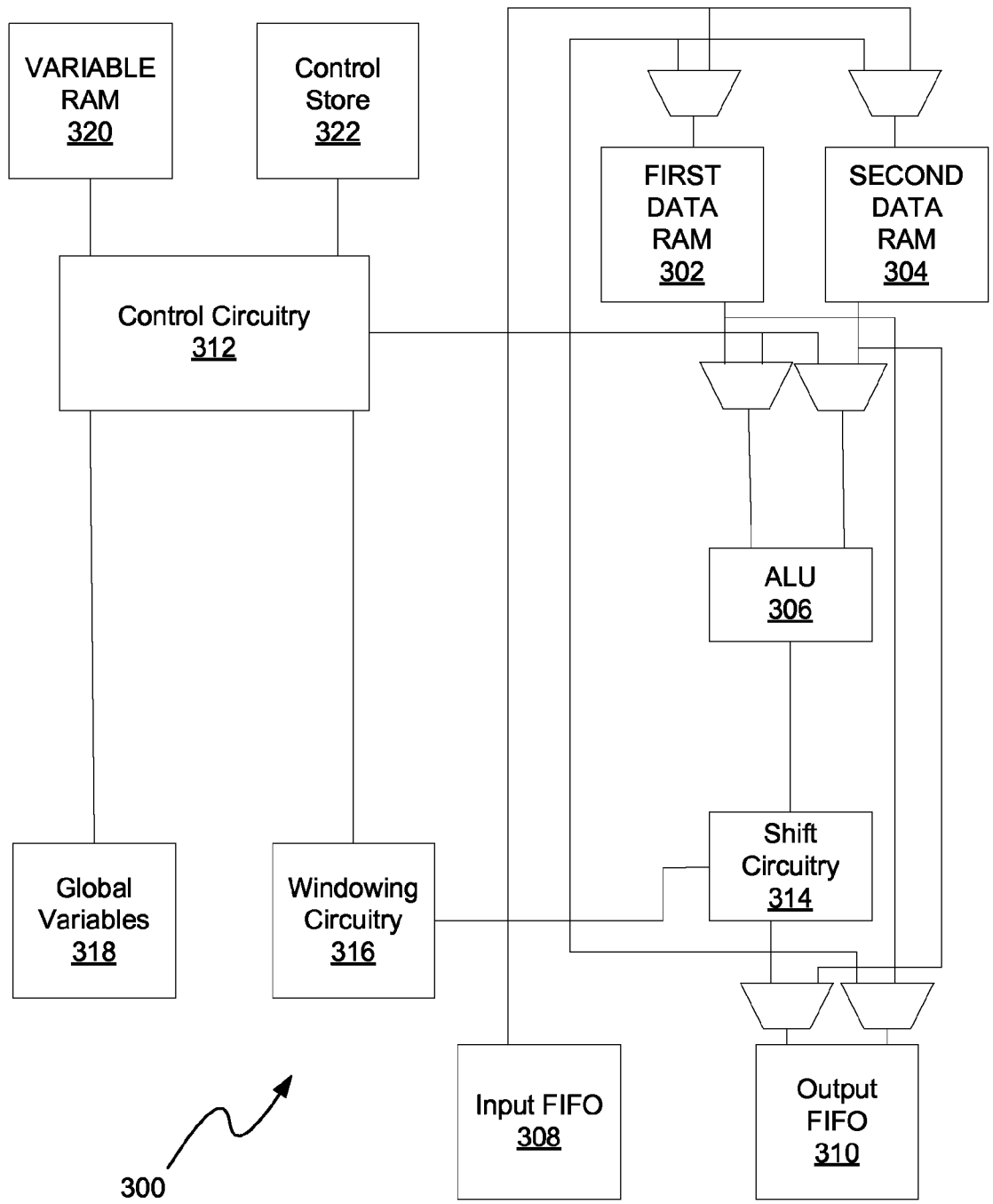
FIG. 3 is a block diagram showing an exemplary embodiment of a modular math processor.

Referring now to FIG. 3 an exemplary embodiment of a modular math processor (MMP) 300 is shown. MMP 300 may be configured to perform operations on large operands (e.g., 512 to 8000 bits) to accomplish large operand multiplication, addition, exponentiation and/or modular reduction techniques, such as Barrett's and Montgomery reduction. In some embodiments, MMP 300 may be configured to perform the operations shown and described in FIGS. 1 and 2.

MMP 300 may include first and second data RAMs 302, 304 and input and output FIFOs 308 and 310. First and second data RAMs 302, 304 may be configured to store operands, such as those received from input FIFOs 308. MMP 300 may further include arithmetic logic unit (ALU) 306, which may be configured to receive operands from first and second data RAMs 302, 304. ALU 306 may be in communication with shift circuitry 308 and control circuitry 312. In some embodiments, ALU 306 may be a standard 64-bit ALU similar to those found in general purpose processors. Shift circuitry 314 may be configured to shift the ALU result either one bit to the left or right depending upon the selected mode. In some embodiments, shifting may be made conditional depending upon whether the ALU result is odd or even. Conditional shifting may optimize the processing of certain algorithms such as the greatest common divisor (GCD) algorithm. Control circuitry 312 may be in communication with a number of different components of MMP 300 including, but not limited to, windowing circuitry 316, global variables 318, variable RAM 320 and control store 322. MMP 300 may be configured to process a variety of operations including, but not limited to, CRT algorithms, GCD algorithms, etc.

The operations described herein may utilize different instruction types, depending upon the particular operation being performed. In some embodiments, a number of different instructions may be executed, depending upon the source and destination operand configuration. For example, FIG. 2 depicts exec, fexec and fifo instructions. An exec instruction may indicate that the inputs to ALU 306 are sent from first and/or second data RAMs 302, 304 instead of input FIFO 308. An exec instruction may also be used to indicate that output FIFO 310 may be an intended destination. Alternatively, a fexec instruction may write the contents of a FIFO into either of data RAM 302, 304, and also may use it as an input operand into ALU 306, while the second ALU input operand may be from either the first or second data RAM 302, 304. A fifo instruction may bypass the ALU 306 and may write the content of the FIFOs 308, 310 into data RAMs 302 and/or 304.

Windowing circuitry 316 may be configured to calculate windows on long exponents for the purpose of reducing the number of multiplications required in modular exponentiation. In exponent windowing, the exponent may be treated as a binary string and the bits may be scanned in either a left-to-right or right-to-left orientation. For example, exponent windowing circuitry 316 may scan the bits of an exponent (e.g., public decryption key d) using either a sliding or fixed windowing configuration. Fixed windowing techniques may be used to scan multiple bits at a given time. With fixed exponent windowing, w bits of d1 may be entered into windowing circuitry 316, followed by w bits of d2. For example, if w=3, 3 bits of d1 may be entered into windowing circuitry 316. Windowing circuitry 316 may then determine the value of the window (e.g., a value in the range of 0 to 7), and may then multiply the appropriate precomputed value, such as global variables 318 (e.g., $G1^0$ to $G1^7$) with A1.

Figure 4:
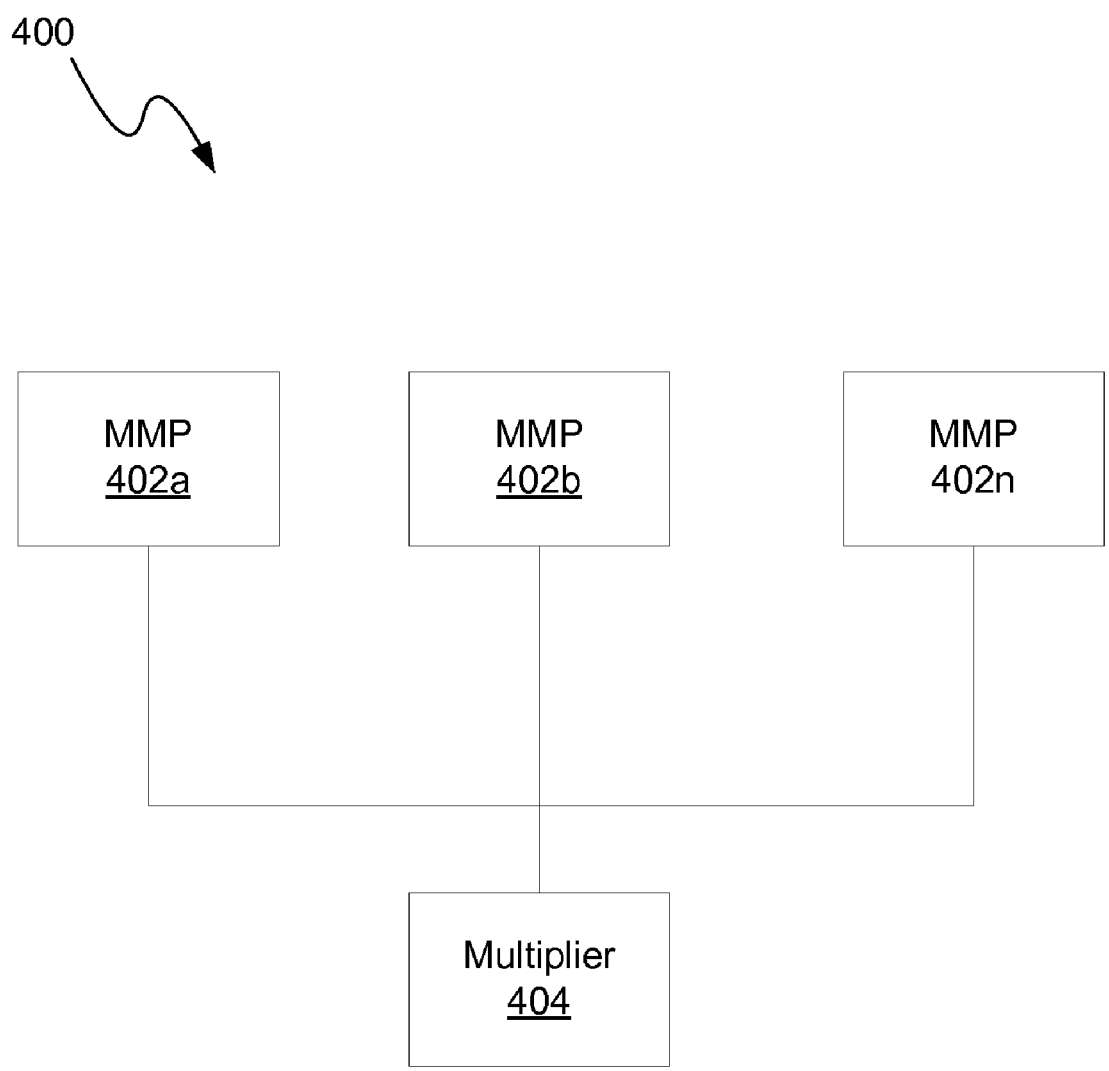
FIG. 4 is a block diagram showing encryption circuitry in accordance with an embodiment of the present disclosure.

One embodiment showing public key encryption (PKE) circuitry 400 is shown in FIG. 4. PKE circuitry 400 may include a plurality of modular math processors (MMPs) 402a, 402b, . . . , 402n. Each MMP may include at least one arithmetic logic unit (ALU) configured to perform vector operations. MMPs 402 may include a control store for the operations described herein as well as large register files configured to store operands, temporary variables and final results. PKE circuitry 400 may further include a multiplier 404 operatively connected to modular math processors 402a-n. In at least one embodiment embodiments, multiplier 404 may be a large (e.g., 515×515) unsigned integer multiplier. PKE circuitry 400 may be used in accordance with the present disclosure to perform the mathematical operations and execute the methods described herein.

Figure 5:
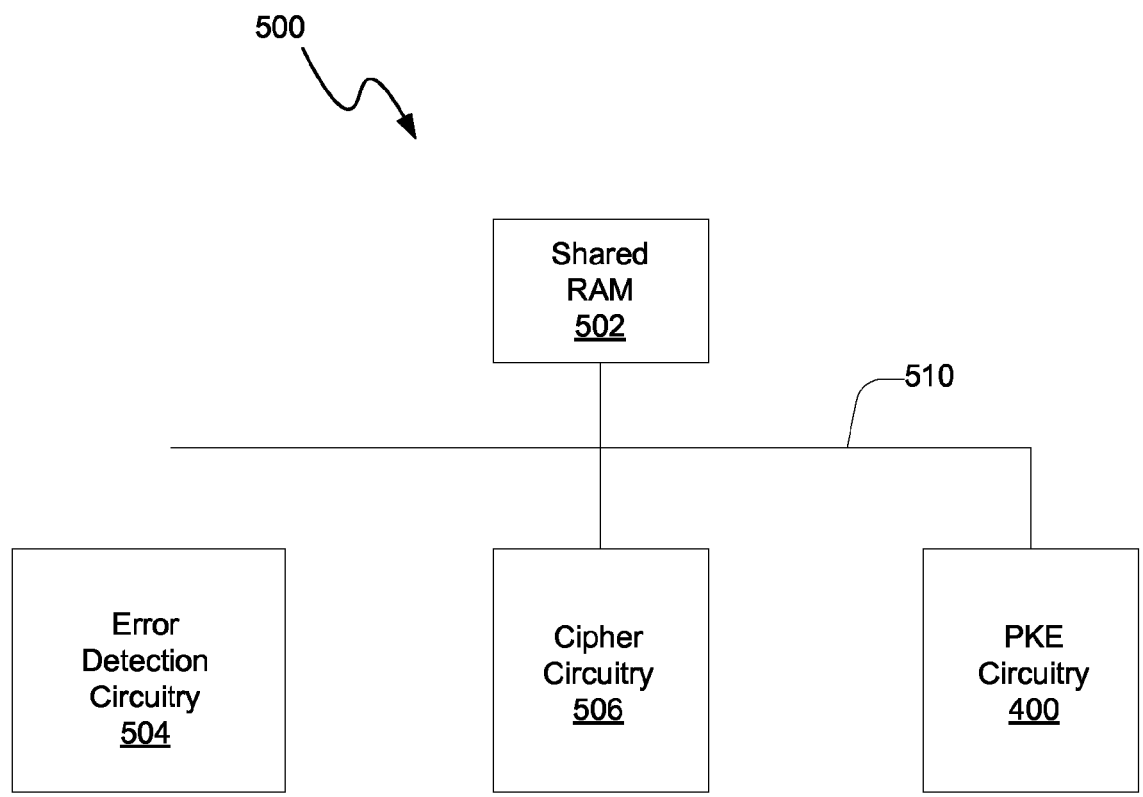
FIG. 5 is a block diagram showing a security processor in accordance with an embodiment of the present disclosure.

Referring now to FIG. 5, PKE circuitry 400 may be included within security processing circuitry 500. Security processing circuitry 500 may be configured to perform encryption operations which may include modular exponentiation operations for generating a public key. Security processing circuitry 500 may include shared RAM 502 operatively connected to error detection circuitry 504, cipher circuitry 506 and public key encryption (PKE) circuitry 400 through internal bus 510. Error detection circuitry 504 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 500 may include both private and public key modules. Cipher circuitry 506 may be configured to generate private keys, which may include execution of symmetric and/or private-key data encryption algorithm such as the data encryption standard (DES) or advanced encryption standard (AES). PKE circuitry 400 may be configured to execute an asymmetric key encryption algorithm and may include generating a public-key/private-key pair.

Figure 6:
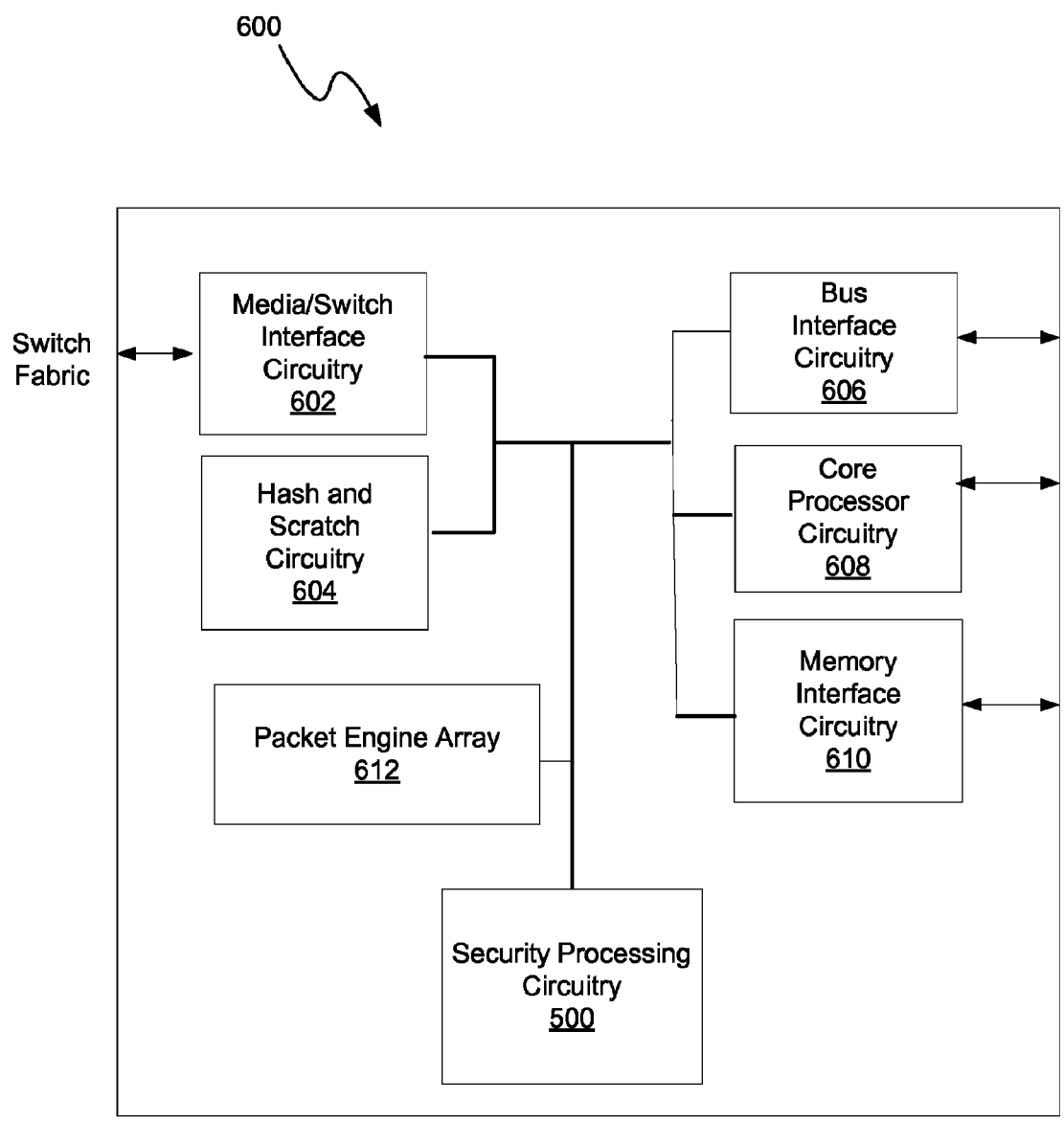
FIG. 6 is a block diagram depicting portions of a network processor in accordance with one embodiment of the present disclosure.

The methodology of FIGS. 1-5 may be implemented, for example, in a variety of multi-threaded processing environments. For example, FIG. 6 is a diagram illustrating one exemplary integrated circuit embodiment (IC) 600 in which may be configured to perform the method of FIG. 1 and/or FIG. 2. "Integrated circuit", as used in any embodiment herein, means a semiconductor device and/or microelectronic device, such as, for example, but not limited to, a semiconductor integrated circuit chip. The IC 600 of this embodiment may include features of an Intel® Internet eXchange network processor (IXP). However, the IXP network processor is only provided as an example, and the operative circuitry described herein may be used in other network processor designs and/or other multi-threaded integrated circuits.

IC 600 may include media/switch interface circuitry 602 (e.g., a CSIX interface) capable of sending and receiving data to and from devices connected to the integrated circuit such as physical or link layer devices, a switch fabric, or other processors or circuitry. IC 600 may also include hash and scratch circuitry 604 that may execute, for example, polynomial division (e.g., 48-bit, 64-bit, 128-bit, etc.), which may be used during some packet processing operations. IC 600 may also include bus interface circuitry 606 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from IC 600 or external memory. The IC may also include core processor circuitry 608. In this embodiment, core processor circuitry 608 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 608 may comprise other types of processor core circuitry without departing from this embodiment. Core processor circuitry 608 may perform "control plane" tasks and management tasks (e.g., look-up table maintenance, etc.). Alternatively or additionally, core processor circuitry 608 may perform "data plane" tasks (which may be typically performed by the packet engines included in the packet engine array 618, described below) and may provide additional packet processing threads.

Integrated circuit 600 may also include a packet engine array 618. The packet engine array may include a plurality of packet engines. Each packet engine may provide multi-threading capability for executing instructions from an instruction set, such as a reduced instruction set computing (RISC) architecture. Each packet engine in the array 618 may be capable of executing processes such as packet verifying, packet classifying, packet forwarding, and so forth, while leaving more complicated processing to the core processor circuitry 608. Each packet engine in the array 618 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 600 may also include memory interface circuitry 610. Memory interface circuitry 610 may control read/write access to external memory. Machine readable firmware program instructions may be stored in external memory, and/or other memory internal to the IC 600. These instructions may be accessed and executed by integrated circuit 600. When executed by integrated circuit 600, these instructions may result in integrated circuit 600 performing the operations described herein, for example, operations described above with reference to FIG. 1.

Figure 7:
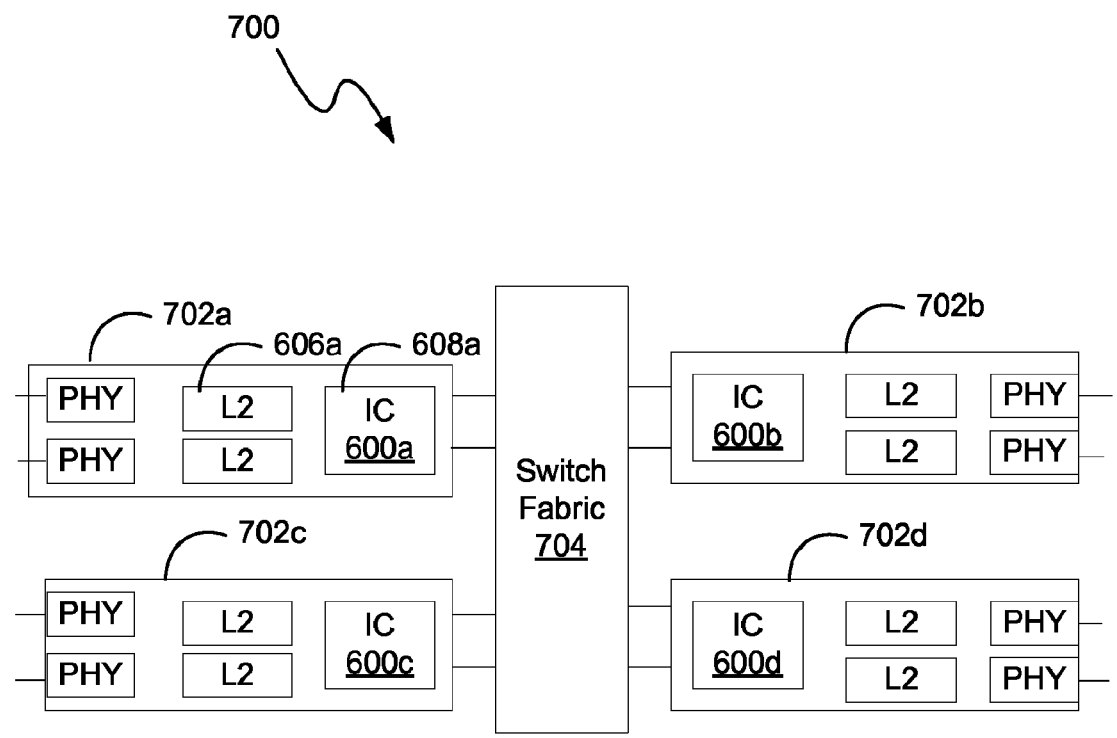
FIG. 7 is a diagram illustrating one exemplary system embodiment.

FIG. 7 depicts one exemplary system embodiment 700. This embodiment may include a collection of line cards 702a, 702b, 702c and 702d ("blades") interconnected by a switch fabric 704 (e.g., a crossbar or shared memory switch fabric). The switch fabric 704, for example, may conform to CSIX or other fabric technologies such as HyperTransport, Infiniband, PCI-X, Packet-Over-SONET, RapidIO, and Utopia. Individual line cards (e.g., 702a) may include one or more physical layer (PHY) devices 702a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 706a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 600a, which may include network processors, and may be embodied as integrated circuit packages (e.g., ASICs). In addition to the operations described above with reference to integrated circuit 600, in this embodiment integrated circuit 600a may also perform packet processing operations for packets received via the PHY(s) 702a and direct the packets, via the switch fabric 704, to a line card providing the selected egress interface.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In alternate embodiments, the embodiment of FIGS. 3, 4, 5, and/or 6 may be configured as a "network device", which may comprise for example, a switch, a router, a hub, and/or a computer node element configured to process data packets, a plurality of line cards connected to a switch fabric (e.g., a system of network/telecommunications enabled devices) and/or other similar device. Also, the term "cycle" as used herein may refer to clock cycles. Alternatively, a "cycle" may be defined as a period of time over which a discrete operation occurs which may take one or more clock cycles (and/or fraction of a clock cycle) to complete. Additionally, the operations described above with reference to FIG. 1 may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Accordingly, at least one embodiment described herein may provide a method for performing modular exponentiation. The method may include generating a first remainder (xp) based on an encrypted message (X) modulo a first prime number (p) and generating a second remainder (xq) based on the encrypted message (X) modulo a second prime number (q). The method may further include generating a third remainder (v1) based on the first remainder (xp) raised to a first private key number (d1) modulo the first prime number (p) and simultaneously generating a fourth remainder (v2) based on the second remainder (xq) raised to a second private key number (d2) modulo the second prime number (q). The method may also include subtracting the fourth remainder (v2) from the third remainder (v1) to yield a result (v1−v2) and multiplying the result (v1−v2) by a constant (c) to produce a second result. The method may additionally include generating a sixth remainder (h) by taking the second result modulo the first prime number (p) and multiplying the sixth remainder (h) by the second prime number (q) to produce a third result. The method may further include adding the third result and the fourth remainder (v2) to yield a final result (Y) and generating, at least in part, a public key based on the final result (Y).

The embodiments described herein may provide numerous advantages over the prior art. For example, some embodiments may be used to optimize processing performance on modular exponentiation operations by interleaving the calculation of two separate modular exponentiation problems using an exponent windowing approach. Moreover, the embodiments described herein may be used in accordance with any general purpose processor that includes an integer multiplier and an arithmetic logic unit (ALU).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
an integrated circuit (IC) configured to calculate a first remainder (Xp) based on an encrypted message (X) modulo a first prime number (p); the IC further configured to calculate a second remainder (Xq) based on the encrypted message (X) modulo a second prime number (q); the IC further configured to calculate a third remainder (v1) based on the first remainder (Xp) raised to a first private key number (d1) modulo the first prime number (p) and to simultaneously calculate a fourth remainder (v2) based on the second remainder (Xq) raised to a second private key number (d2) modulo the second prime number (q); the IC further configured to subtract the fourth remainder (v2) from the third remainder (v1) to yield a result (v1–v2) and to multiply the result (v1–v2) by a constant (c) to produce a second result; the IC further configured to calculate a sixth remainder (h) by taking the second result modulo the first prime number (p) and to multiply the sixth remainder (h) by the second prime number (q) to produce a third result; the IC further configured to add the third result and the fourth remainder (v2) to yield a final result (Y) and to generate, at least in part, a public key based upon the final result (Y).

2. The apparatus of claim 1, wherein the IC is configured to simultaneously calculate a third remainder and a fourth remainder via instruction interleaving.

3. The apparatus of claim 1, wherein the first private key number and the second private key number are computed from a decryption key.

4. The apparatus of claim 1, wherein the IC is configured to multiply using an integer multiplier.

5. The apparatus of claim 4, further comprising an input and an output FIFO operatively connected to the multiplier, the input and output FIFO configured to provide input to the multiplier and to receive output from the multiplier.

6. The apparatus of claim 1, wherein the IC is further configured to perform exponent windowing upon the first and/or second private key number via windowing circuitry.

7. The method of claim 6, wherein the exponent windowing is selected from the group consisting of sliding and fixed exponent windowing.

8. An article comprising a computer readable, non-transitory storage medium having stored thereon instructions that when executed by a machine result in the following:
generating a first remainder (Xp) based on an encrypted message (X) modulo a first prime number (p);
generating a second remainder (Xq) based on the encrypted message (X) modulo a second prime number (q);
generating a third remainder (v1) based on the first remainder (Xp) raised to a first private key number (d1) modulo the first prime number (p) and simultaneously generating a fourth remainder (v2) based on the second remainder (Xq) raised to a second private key number (d2) modulo the second prime number (q);
subtracting the fourth remainder (v2) from the third remainder (v1) to yield a result (v1–v2);
multiplying the result (v1–v2) by a constant (c) to produce a second result;
generating a sixth remainder (h) by taking the second result modulo the first prime number (p);
multiplying the sixth remainder (h) by the second prime number (q) to produce a third result;
adding the third result and the fourth remainder (v2) to yield a final result (Y); and
generating, at least in part, a public key based on the final result (Y).

9. The article of claim 8, wherein simultaneously generating a third remainder and generating a fourth remainder is performed via instruction interleaving.

10. The article of claim 8, wherein the first private key number and the second private key number are computed from a decryption key.

11. The article of claim 8, wherein multiplying is performed using an integer multiplier.

12. The article of claim 11, wherein a FIFO is operatively connected to the multiplier, the FIFO configured to provide input to the multiplier and to receive output from the multiplier.

13. The article of claim 8, further comprising performing exponent windowing upon the first and/or second private key number via windowing circuitry.

14. The article of claim 13, wherein the exponent windowing is selected from the group consisting of sliding and fixed exponent windowing.

15. A system comprising:
a plurality of line cards and a switch fabric interconnecting said plurality of line cards, at least one line card comprising:
at least one physical layer component (PHY); and
an integrated circuit (IC) configured to calculate a first remainder (Xp) based on an encrypted message (X) modulo a first prime number (p); the IC further configured to calculate a second remainder (Xq) based on the encrypted message (X) modulo a second prime number (q); the IC further configured to calculate a third remainder (v1) based on the first remainder (Xp) raised to a first private key number (d1) modulo the first prime number (p) and to simultaneously calculate a fourth remainder (v2) based on the second remainder (Xq) raised to a second private key number (d2) modulo the second prime number (q); the IC further configured to subtract the fourth remainder (v2) from the third remainder (v1) to yield a result (v1–v2) and to multiply the result (v1–v2) by a constant (c) to produce a second result; the IC further configured to calculate a sixth remainder (h) by taking the second result modulo the first prime number (p) and to multiply the sixth remainder (h) by the second prime number (q) to produce a third result; the IC further configured to add the third result and the fourth remainder (v2) to yield a final result (Y) and to generate, at least in part, a public key based on the final result (Y).

16. The system according to claim 15, wherein the IC is configured to simultaneously calculate a third remainder and a fourth remainder via instruction interleaving.

* * * * *